June 4, 1968   A. F. RUSSO ET AL   3,386,733

BATTING PRACTICE DEVICE

Filed Aug. 25, 1965

INVENTORS
ANTHONY F. RUSSO
RICHARD SMALL
BY Mark Basseches
ATTORNEY

United States Patent Office 3,386,733
Patented June 4, 1968

3,386,733
BATTING PRACTICE DEVICE
Anthony F. Russo, 164—16 88th St., Howard Beach, N.Y. 11414, and Richard Small, 24 Gold St., Valley Stream, N.Y. 11580
Filed Aug. 25, 1965, Ser. No. 482,399
7 Claims. (Cl. 273—26)

ABSTRACT OF THE DISCLOSURE

A batting practice device or the like comprising a frame defining a vertical clearance area, the clearance area including impact simulator means particularly in the form of downwardly and upwardly directed resilient target members, yieldably resisting passage of a bat or the like through said target area.

This invention relates to an athletic training device, and more particularly to a batting practice device useful in aiding a batsman to perfect his coordination, timing and stroke.

Still more particularly, this invention relates to a baseball practice device for training a batsman, which is useful both as a means for perfecting the batter's swing and as a warmup device for an experienced batter.

Still more particularly, this invention relates to a batting device which simulates realistically the impact experienced by a batsman when striking a pitched ball, the device providing a simple adjustment which enables the device to simulate the feeling experienced by a batsman when striking a fast or slow pitch. The device further permits adjustment to enable the batsman to practice hitting high or low pitches, etc.

Accordingly, it is a primary object of the invention to provide a simple and durable device, capable of being left out of doors, which enables the batsman to experience the feeling of impact when striking a batted ball.

A further object of the invention is to provide a training device as described which aids in developing a level batting stroke by indicating to the batsman, through the feeling at impact, whether the stroke has been properly effected.

To attain these objects and such further objects as may appear herein or be hereinafter pointed out, we make reference to the accompanying drawings, forming a part hereof, in which.

Figure 3:
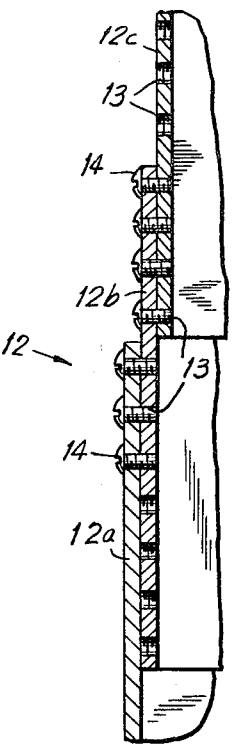
FIGURE 3 is a magnified section taken on the line 3—3 of FIGURE 1.

In accordance with the invention, there is shown a batting training device 10 which comprises generally a base 11 having mounted thereon a trunk or stanchion 12. The stanchion is preferably vertically adjustable and may include two or more vertical sections which are telescopically nested. In the drawings three sections, 12a, 12b, 12c, are shown. As best seen in FIGURE 3, the sections may be variably positioned by providing the same with spaced, threaded apertures 13, 13, which may be variously aligned in registering position and held in any desired relationship by bolts 14 which extend through the apertures. It will be readily recognized that any other suitable fastening means, such as clamps or the like, may be employed for effecting this adjustment.

Figure 1:
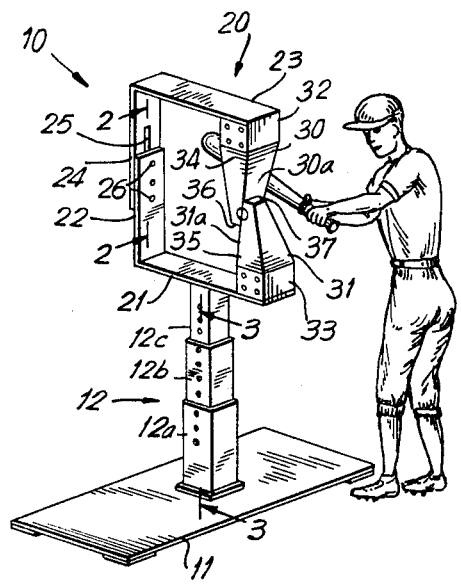
FIGURE 1 is a perspective view of a batting device and batsman positioned to use the same.
Figure 2:
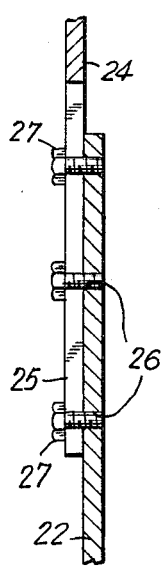
FIGURE 2 is a magnified section taken on the line 2—2 of FIGURE 1.

Atop the uppermost stanchion element 12c, there is fastened, by welding or otherwise, a generally C-shaped frame member 20. The frame member 20 may include a horizontally extending lower arm 21 which is fastened to the stanchion element 12c, the arm including a vertical bracket portion 22. The frame includes an upper arm 23 having a downwardly directed offset end portion 24. In the illustrated embodiment, the end portion is slotted, as at 25, and the bracket 22 incorporates a plurality of threaded apertures 26. As best seen in FIGURE 2, the bolts 27, having their shank portions pass through the slot 25 and threaded into the apertures 26, firmly connect the portions 24 and 25 to each other. By reason of the length of the slot 25, there is provided a range of adjustment whereby the upper arm 23 may be raised or lowered with respect to the lower arm 21.

From the foregoing description, it will be evident that the C-shaped frame 20 defines between the upper and lower arms 23, 21, respectively, a clearance area through which a batsman may swing a baseball bat, obstructed only by the impact device next to be described.

In the illustrated embodiment, the impact device comprises upper and lower target members 30, 31 respectively. The target members 30, 31 are attached to the upper and lower arms 23, 21, respectively, by suitable clamping socket members 32, 33, respectively, made fast adjacent the outer extremities of the areas 23 and 21. The sockets 32, 33 include clamping means for embracing and firmly securing the end portions of the target members 30, 31. Optionally but preferably, the target members 30, 31 may comprise heavy but yieldable elongated rubber elements. In the illustrated embodiment, these elements are beveled, tapering from thickened end portions 34, 35 to relatively thinner free ends 36, 37.

Preferably the target members 30, 31 are offset one from the other so that the outwardly directed side 30a of the upper target member 30 laps and is disposed adjacent the inwardly directed side 31a of the lower target member 31.

From the foregoing it will be readily recognized that when the lower and upper arms 21, 23 are spread further apart by the adjustment means previously described, smaller overlap of the free ends 36, 37 will result, and vice versa.

The device is used by first adjusting the stanchion 12 to dispose the overlapping portions of the upper and lower impact members at any desired height, normally corresponding with a height within the "strike zone" of the batter using the device. If desired, a target indicator or indicators 40, 40 may be painted or otherwise marked on one or both of the target elements, such indicators being placed on both the front and rear faces of the target members to enable the device to be used by both right and left handed batsmen.

Figure 6:
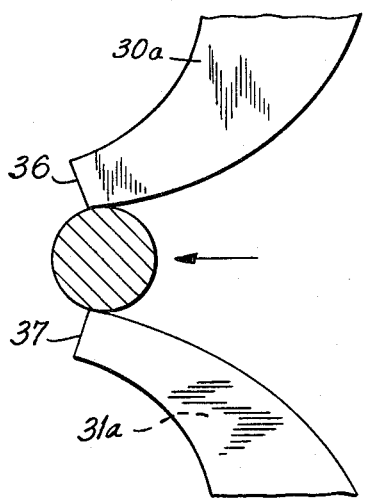
FIGURE 6 is a diagrammatic view showing the position of the parts as a bat passes through the impact area.

After the batsman makes the initial height adjustment, he may adjust the vertical spacing of the lower and upper arms 21, 23, respectively, through the adjustment bolts 27. In making this adjustment, it will be evident that the greater the degree of overlap, the greater will be the force required to cause a bat to swing through and press apart the target members 30, 31, in the manner shown in FIGURE 6.

We have determined that to simulate the impact of a regulation baseball pitched at a speed of about ninety miles per hour, the overlap should be adjusted so that a force of about nineteen pounds at the median point of overlap of the target members is required to permit a bat to spread and pass through this area.

Figure 4:
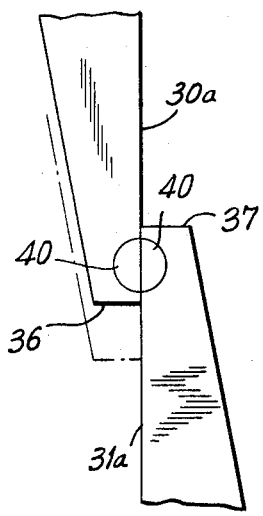
FIGURE 4 is a front view showing details of the impact simulator portions of the invention, showing in dot and dash lines a range of adjustment.
Figure 5:
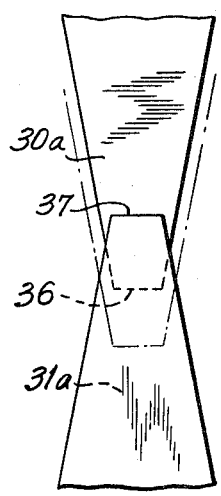
FIGURE 5 is a side view of the impact mechanism of FIGURE 4.

The dot and dash lines shown in FIGURES 4 and 5 roughly indicate a range of adjustment which will permit a greater or lesser impact, to cause rearward deflection and spreading of the target members and the passage therethrough of the baseball bat.

An important advantage of the device is that the same aids in developing a level swing, thereby necessitating a proper wrist roll. This important objective is achieved since a lesser force is necessary to deflect the target members and permit passage of the bat if the bat is swung in an arc which is precisely horizontal and thus engages perpendicularly against the faces of the targets than in the case of an angular swing. If the bat is swung in a downwardly extending or chopping arc, or upwardly extending uppercut arc, the resistors or target members, by reason of their beveled shape, will provide additional resistance to passage of the bat. Also, even if the bat is swung with sufficient force to permit the same to pass through the target area, a non-horizontally swung bat will be deflected either upwardly or downwardly, thus immediately making the batsman aware of the improper stroke.

From the foregoing it will be evident that we have devised a simple, readily adjustable batting trainer device which will enable a batsman to correct his stroke and also to increase his power by providing proper exercise and by permitting him to simulate impact against a wide variety of pitches. The device has been found particularly effective when used as a "warm-up" just prior to a turn at bat. Furthermore, the device provides a specific target to be struck by the bat. If the impact point of the bat is either above or below the desired target, resistance to passage of the bat through the target area is materially increased. Thus, the device also aids the batter in achieving accuracy.

It will be readily recognized that variations may be made on the illustrated embodiment of the invention without departing from the spirit thereof. For instance, variations of the specific target members used will readily suggest themselves to the skilled worker in the light of the foregoing disclosure. Accordingly, the invention should be broadly construed within the scope of the appended claims.

Having thus described the invention and illustrated its use, what is claimed as new and is desired to be secured by Letters Patent is:

1. A batting practice device comprising a frame having an open side, said frame defining a horizontal clearance area, adjustment means for raising and lowering said frame, and impact simulator means carried by said frame in said clearance area and including a downwardly extending, yieldable target member having a free end movable in a vertical plane, an upwardly extending, yieldable target member having a free end movable in a vertical plane, said target members being disposed in side-by-side, overlapping relation, with the overlapped portion of said targets lying in said clearance area.

2. A device in accordance with claim 1 and including impact adjustment means for varying the extent of overlap of said yieldable target members.

3. A practice and training device for developing and perfecting the skills of a batsman comprising a generally C-shaped frame having a vertical back portion, and upper and lower horizontal arms extending from said back portion, said arms being vertically spaced apart and defining therebetween a clearance area, a first elongated, resilient target member having its upper end fixed to said upper arm and having a free end extending downwardly into said clearance area in spaced relation to said back portion, and a second resilient target member having its lower free end fixed to said lower arm and having a free end extending upwardly into said clearance area, said target members together forming a barrier to passage of a bat through said area.

4. A device in accordance with claim 3 wherein one of said target members is disposed closer to said back portion than the other of said target members, and the free end of said upper target member extends below the free end of said lower target member.

5. A device in accordance with claim 4 wherein said target members are in proximate side-by-side position, and said back portion of said frame is adjustable to variably space said arms and thereby vary the overlap of said target members.

6. A practice and training apparatus for developing and perfecting the skills of a batsman comprising a base, a stanchion extending upwardly from said base, means for extending and contracting said stanchion, a generally C-shaped frame carried by said stanchion, said frame including a back portion and upper and lower, generally horizontally disposed arms extending from said back portion, said arms being spaced apart and located in the same vertical plane, adjustment means for varying the vertical extent of said back portion, an elongated rubber target member having an end fixed to said upper arm and having a downwardly directed free end, an elongated rubber target member having an end fixed to said lower arm and having an upwardly directed free end, said free ends lying in side-by-side overlapping position.

7. A device in accordance with claim 3 wherein the cross sectional area of said target members decreases gradually from said fixed ends toward said free ends.

References Cited

UNITED STATES PATENTS

| | | | |
|---|---|---|---|
| 519,078 | 5/1894 | Wilson | 273—102 |
| 708,573 | 9/1902 | Miles | 273—29.1 |
| 1,554,409 | 9/1925 | Coffee | 273—26 |
| 2,752,155 | 6/1956 | Nedwick | 273—55 |
| 3,301,556 | 1/1967 | Hamilton et al. | 273—26 |

RICHARD C. PINKHAM, *Primary Examiner.*

P. E. SHAPIRO, *Assistant Examiner.*